United States Patent
Abdo et al.

(10) Patent No.: US 7,032,134 B2
(45) Date of Patent: Apr. 18, 2006

(54) MICROPROCESSOR DESIGN SUPPORT FOR COMPUTER SYSTEM AND PLATFORM VALIDATION

(75) Inventors: Ayman G. Abdo, Chandler, AZ (US); Cameron McNairy, Fort Collins, CO (US); Piyush Desai, Pleasanton, CA (US); Quinn W. Merrell, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 499 days.

(21) Appl. No.: 09/818,788

(22) Filed: Mar. 28, 2001

(65) Prior Publication Data

US 2002/0144183 A1 Oct. 3, 2002

(51) Int. Cl.
*G06F 11/22* (2006.01)

(52) U.S. Cl. .............................. 714/37; 714/30; 714/43; 714/47

(58) Field of Classification Search ................... 714/30, 714/37, 34, 43, 47, 712; 711/146; 716/5, 716/6
See application file for complete search history.

(56) References Cited

U.S. PATENT DOCUMENTS

| | | | |
|---|---|---|---|
| 4,858,234 A * | 8/1989 | Hartwell et al. | 714/24 |
| 5,001,712 A | 3/1991 | Splett et al. | |
| 5,142,673 A * | 8/1992 | De Angelis et al. | 714/39 |
| 5,151,981 A * | 9/1992 | Westcott et al. | 714/47 |
| 5,596,715 A | 1/1997 | Klein et al. | |
| 5,701,409 A | 12/1997 | Gates | 395/183.17 |
| 6,018,807 A * | 1/2000 | Larson | 714/33 |
| 6,134,684 A | 10/2000 | Baumgartner et al. | |
| 6,480,923 B1 * | 11/2002 | Moertl et al. | 714/4 |
| 6,609,221 B1 * | 8/2003 | Coyle et al. | 714/715 |
| 6,618,775 B1 * | 9/2003 | Davis | 710/100 |
| 6,662,256 B1 * | 12/2003 | Foo | 710/305 |

FOREIGN PATENT DOCUMENTS

GB 2 338 791 12/1999

* cited by examiner

*Primary Examiner*—Robert Beausoliel
*Assistant Examiner*—Joseph D Manoskey
(74) *Attorney, Agent, or Firm*—Kenyon & Kenyon

(57) ABSTRACT

A validation FUB is a hardware system within the agent that can place a computer system in a stress condition. A validation FUB may monitor transactions posted on an external bus and generate other transactions in response to the monitored transactions. The validation FUB may be a programmable element whose response may be defined by an external input. Accordingly, the validation FUB may test a wide variety of system events.

27 Claims, 5 Drawing Sheets

100

1000

200

400

500

600

MICROPROCESSOR DESIGN SUPPORT FOR COMPUTER SYSTEM AND PLATFORM VALIDATION

BACKGROUND

The present invention relates to stress testing for microprocessors and other agents in a computer system. More specifically, the present invention relates to an on-die validation functional unit block ("FUB") provided in an agent such as a microprocessor.

In a computer system, an "agent" may include any device that communicates with other devices via a common communication bus using a common bus interface protocol. Typical agents include microprocessors, memory controllers, bridge interface circuits, digital signal processors and application specific integrated circuits. As can be appreciated, a modern agent may include several hundreds of thousands of transistors fabricated into a single integrated circuit. Although circuit designs are simulated before the circuit designs are fabricated in an operable integrated circuit, validation testing is necessary to ensure that the integrated circuit actually behaves in practice as the design intends.

Validation testing includes stress testing. Stress testing involves pushing the operating conditions of an agent to its performance limits to determine that the agent's actual behavior matches simulated predictions. Stress testing, however, is a costly, complicated hit-or-miss process because it traditionally is performed through software-controlled algorithms. When an integrated circuit is manufactured, traditional stress testing requires that the integrated circuit execute program instructions that are designed to place the agent in a predetermined condition of stress. For example, software may be written to cause two different processors to continually read and modify data at the same memory location. By creating contention between the two processors, it provides an opportunity for validation personnel to observe the behavior of the processors as they compete over the same piece of data. Of course, the precise instant when the desired stress event occurs cannot be predicted. Thus, diagnostic personnel must observe thousands of bus transactions to determine when (sometimes, if) the stress event occurs. Not only is it expensive to design stress-testing software, it is expensive to review and interpret stress testing results.

Software-controlled algorithms do not provide much control at all. To test the functioning of external bus logic, the circuitry within an agent that controls the agent's interface to the external bus, it is desirable to maintain a sustained level of high traffic on the bus. Software-controlled algorithms can be interrupted by context switches by the operating system and other events. This can lower the level of traffic on the bus. Additionally, there is no way to software-controlled algorithms cannot respond to events on the external bus sufficiently quickly to guarantee that timing relationships can be maintained on the bus to test certain bus events. Indeed, there are many events that validation engineers would like to test that cannot be sensed by software at all. All of these issues reduce the efficiency of validation testing through software.

Accordingly, there is a need in the art for an improved validation testing scheme for use in a processor or other agent.

DETAILED DESCRIPTION

Embodiments of the present invention provide a validation FUB for an agent, a hardware system within the agent that places a computer system in a stress condition. A validation FUB may monitor transactions posted on an external bus and generate other transactions in response to the monitored transactions. The validation FUB may be a programmable element whose response may be defined by an external input. Accordingly, the validation FUB may test a wide variety of system events.

Figure 1:
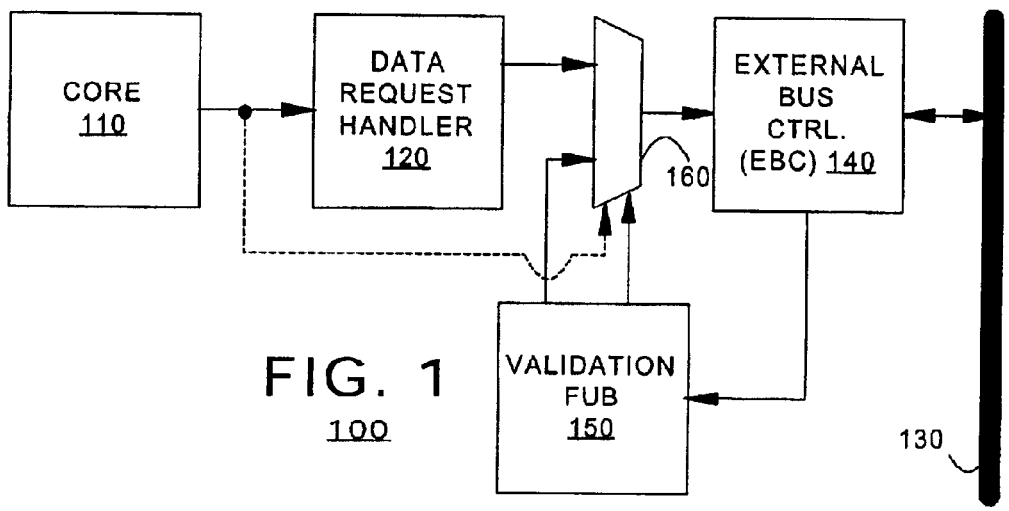
FIG. 1 is a simplified block diagram of FUBs in an agent according to an embodiment of the present invention.

FIG. 1 is a simplified block diagram of FUBs in an agent 100 according to an embodiment of the present invention. An agent 100 may include a core 110 and data request handler 120 provided in communication with an external bus 130. The data request handler 120 may interface with the bus 130 via an external bus controller ("EBC") 140. The EBC 140 manages the progress of transactions on the external bus 130. The core 110 may read and modify data as it executes program instructions. It may generate data requests to the data request handler 120, to read data from or store data to predetermined memory locations of a system memory (not shown).

The data request handler 120 may receive data requests from the core 110 and from possibly other sources (not shown) within the agent 100. It interprets the data requests and, if the agent must communicate with other agents to fulfill the request, it generates an external bus transaction in response thereto. The data request handler 120 may include various queues for management of the data requests and may interface with other FUBs, for example internal caches (not shown), to manage the data requests. In this regard the architecture and operation of an agent 100 is well-known.

An embodiment of the present invention may introduce a validation FUB 150 into an agent 100. The validation FUB 150 may be coupled to the EBC 140 to observe transactions posted on the external bus 130. In response to a predetermined triggering condition, the validation FUB 150 may generate data for a new transaction, called a "harassing" bus transaction, to be posted on the external bus 130. Several different types of triggering conditions are possible. When a new external bus transaction is observed, a harassing transaction may be generated if a request type of the new transaction matches a predetermined type. The first external bus transaction is said to be a "triggering" transaction. Alternatively, all external bus transaction (except harassing transactions from the validation FUB 150) may be triggering transactions. In this case, harassing bus transactions would be generated for every transaction on the external bus 130.

An agent 100 may include a selection multiplexer ("MUX") 160 to select transaction data from either the data request handler 120 or the MUX 160. In one embodiment, the MUX 160 may be controlled solely by the validation FUB 150. In an alternate embodiment, shown in phantom, the MUX 160 may be controlled both by the validation FUB 150 and by the core 110. In this case, data requests from the core 110 may have a higher priority than the data requests from the validation FUB 150. This alternate embodiment is discussed in greater detail herein.

The validation FUB 150 may provides several advantages for stress testing over prior, software-controlled schemes. The validation FUB 150 operates within the clock domain of the agent in which it sits and, therefore, can create stress test events with greater reliability than would be available in a software-controlled algorithm. In certain applications, the validation FUB 150 can observe a triggering bus transaction and generate a new "harassing" bus transaction as the very next bus transaction. Thus, using the foregoing example where two agents compete for the same piece of data, the validation FUB 150 of the present embodiment can be used in a such a way so as to ensure that a harassing bus transaction is generated in response to each and every bus transaction requesting the contested data. Each time a transaction requesting the data is observed, the validation FUB may generate another bus transaction addressing the same data. Thus, the hit-or-miss nature of software-controlled algorithms can be avoided.

Because the validation FUB 150 operates within the clock domain of the agent, a clock that often is much faster than the clock domain of the external bus, it may generate stress conditions with much finer timing relationships than were previously possible. Consider an embodiment where the external bus is a pipelined bus. In a pipelined bus protocol, such as the bus protocol defined for the Pentium Pro® processor, data is requested in a bus transaction. A bus transaction may be organized into a variety of phases. For the Pentium Pro® processor, the bus transaction includes an arbitration phase, a request phase, an error phase, a snoop phase, a response phase and, finally, a data phase. Each type of data request does not proceed through all possible phases. A pipelined bus may permit several bus transactions to be in progress on the bus simultaneously but each request must be in a different phase. Thus, after first transaction concludes the request phase and enters the error phase, a second transaction may enter the request phase. Transitions among the various phases occurs at the clock domain of the external bus. For more information, reference may be made to the *Pentium® Pro Family Developer's Manual*, Volume 1: Specifications (http://developer.intel.com/design/pro/MANUALS/242690. HTM).

The validation FUB 150, because it may operate in the domain of the agent's clock, may detect and respond to triggering conditions often while the triggering bus transaction remains pending on the external bus. Thus, in an embodiment, a validation FUB 150 may generate and post a harassing transaction on the bus before the transaction that triggered it concludes. No known stress testing technique permits an agent to capture and respond to a triggering transaction while the triggering transaction remains pending on an external bus.

The validation FUB 150 provides another advantage in that it can stress test a single-processor computing system. Software-controlled stress testing typically required at least two processors each executing custom software to generate desired stress test scenarios. A validation FUB 150 may eavesdrop on transactions generated by the agent in which it is located and may generate harassing transactions in response to transactions observed on the external bus. Further, no special software is necessary. Thus, instead of investing time and money to develop custom software applications for multiple processors, a validation FUB 150 permits developers to stress test their agents in a single-agent system executing off-the-shelf software packages. The validation FUB 150, therefore, can dramatically reduce development costs for integrated circuit developers.

Figure 2:
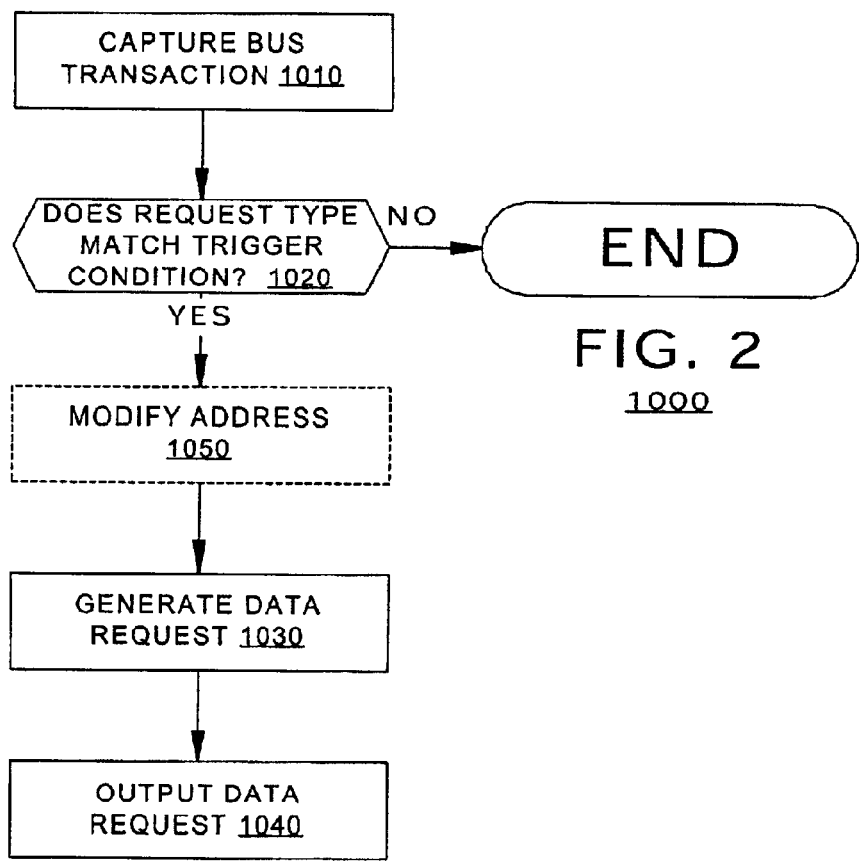
FIG. 2 is a flow diagram illustrating a method of operation according to an embodiment of the present invention.

FIG. 2 is a flow diagram illustrating a method of operation 1000 according to an embodiment of the present invention. Operation may begin when a new transaction is posted on the external bus. According to the embodiment, transaction data may be captured by the validation FUB (box 1010). The validation FUB may determine whether a request type of the transaction matches a predetermined triggering condition (box 1020). If so, the validation FUB may generate harassing transaction data using an address captured from the external bus transaction (box 1030). The new data request may be output to the EBC (box 1040). If the captured data request did not match the predetermined triggering condition, the method may end.

Optionally, when the captured request type data matches a triggering condition, the captured address may be modified (box 1050, shown in phantom). For example, the captured address may be incremented or decremented by a cache line increment. As is known, memory systems typically are organized into predetermined units commonly called "cache lines." For example, in the Pentium Pro® processor, commercially available from Intel Corporation, cache lines are 32 bytes in length. In other processors, cache lines may have different lengths. By incrementing (or decrementing) a latched address by a cache line unit, the validation FUB 150 may direct transactions to adjacent locations in system memory. In such an embodiment, rather than direct a new external transaction to the same address as was observed on the external bus, the validation FUB 150 may direct the new external transaction to an adjacent cache line.

In another embodiment, captured address may be incremented or decremented by amounts that are less than a cache line unit. Although agents may exchange data in cache line-sized units, bus transactions typically address system memory using addresses having granularities that are smaller than a cache line increment. Such techniques permit computer systems to identify a data "chunk," data units that are smaller than a cache line size, that is needed by the requesting agent. By addressing the specific chunk that the agent needs, other agents (such as a memory controller or another agent that stored the data) may order delivery of the requested cache line in such a way to provide the requested chunk first, before delivery of other portions of the cache line. For example, in the Pentium Pro® system, a data phase of an external bus transaction may occur over four cycles, each transferring an 8 byte chunk. In such a system, the requested chunk may be transferred in a first cycle, followed by the remaining chunks from the cache line in later cycles.

In this embodiment, where a captured address may be incremented or decremented by an amount that is less than a cache line unit, the validation FUB 150 may cause a new external bus transaction to be posted on the external bus. The new bus transaction would have an address that refers to the same cache line in system memory that was referenced by the captured bus transaction but may refer to a different chunk within the cache line than did the captured bus transaction.

When captured addresses are modified and included within harassing transactions, different system operating conditions may be stress tested. As is known, during operation, agents often retrieve data from consecutive locations in system memory. For example, executable program instructions often are stored in sequential locations of system memories. Data arrays and other structure also often are stored in sequential locations of system memories. By incrementing or decrementing captured addresses by a cache line increment, a validation FUB 150 may retrieve data that is likely to be requested by another agent in a computer system. The validation FUB 150, in essence, would retrieve data in anticipation that another agent will need the data in the near future and can permit stress testing of data contention devices within the computer system.

An embodiment of the present invention imposes a priority scheme among data requests from the core 100 and the validation FUB 150. Returning to FIG. 1, data requests from the validation FUB 150 are shown being input to the MUX 160 along with data requests from the data request handler 120. Thus, data requests from the validation FUB 150 may be thought as "competing" with the data request handler 120 for the resources of the external bus 130. According to an embodiment, the MUX 160 may be controlled not only by the validation FUB 150 but also by the data request handler 120. In such an embodiment, the MUX 160 may select a data request from the data request handler 120 when the core 100 is generating data requests to the data request handler 120. The MUX 160 may select data requests from the validation FUB 150 when there are no data requests being generated by the core 100. Thus, data requests from the data request handler 120 may be processed with higher priority than requests from the validation FUB 150. This feature permits stress testing to occur while a computer system performs useful work.

Figure 3:
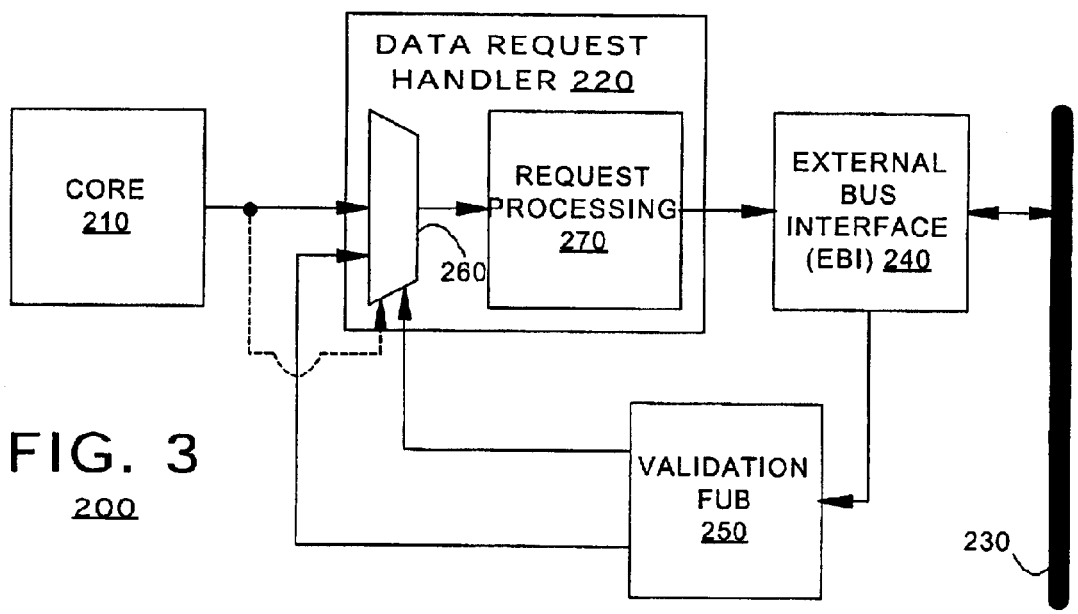
FIG. 3 illustrates an agent according to another embodiment of the present invention.

FIG. 3 illustrates an agent 200 according to another embodiment of the present invention. In this embodiment, an agent 200 may include a core 210 and a data request handler 220 as in the foregoing embodiment. In this embodiment, the data request handler 220 may field data requests from various sources within the agent 200 and may generate external bus transactions to fulfill the data requests. It may interface with the bus 230 via an external bus interface ("EBI") 240 which may include electrical drivers and interface circuitry to generate and capture electrical signals on the bus 230. In this regard, the operation of the agent 200 is well-known.

In an embodiment, the agent 200 may include a validation FUB 250. The validation FUB 250 may interface with the EBI 240 to observe transactions on the external bus 230. The validation FUB 250 may output harassing data requests to the data request handler 220. In this embodiment, the data request handler 220 may include an arbiter 260 for managing data requests input to the data request handler 220 from the core 210 and various other sources. The data request handler 220 would include other processing elements 270 to manage and fulfill the data requests. In this embodiment, the validation FUB 250 may input data requests to the data request handler 220 which would be processed in the same manner as a data request from any other source within the agent 200. Thus, data requests from the validation FUB 250 could be queued by the data request handler 220 and possibly may be fulfilled within the agent 200 itself, depending upon operating conditions.

The embodiment of FIG. 3 optionally may operate according to a priority scheme among data requests. Shown in phantom, the arbiter 260 may be controlled not only by the validation FUB 250 but also by the core 210. While data requests are being generated by the core 210, the arbiter 260 may admit the core data requests to the exclusion of data requests from the validation FUB 250. At other times, the arbiter 260 may admit data requests from the validation FUB 250.

Figure 4:
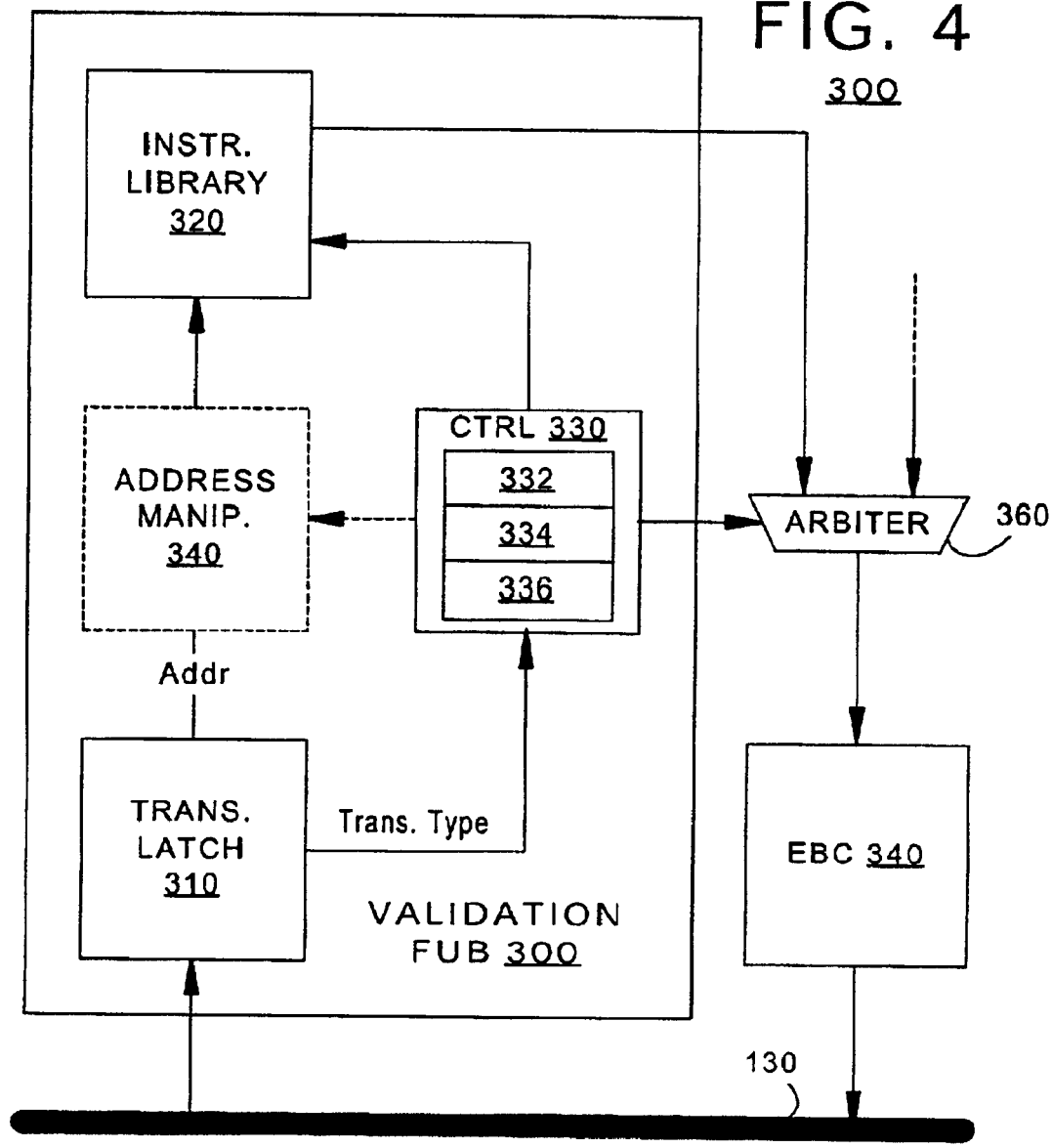
FIG. 4 is a block diagram of a validation FUB according to an embodiment of the present invention.

FIG. 4 is a block diagram of a validation FUB 300 according to an embodiment of the present invention. The validation FUB 300 may include a transaction latch 310, a request library 320 and a controller 330. The transaction latch 310 may receive transaction data from the external bus 130 and latch it for use elsewhere within the validation FUB 300. The request library 320 may be a register memory or other data structure storing data requests. The controller 340 may manage operation of the validation FUB 300.

According to an embodiment, the request library 320 may store data patterns corresponding to each of the data requests that can be handled by the data request handler 120 (FIG. 1). The request library 320 may receive latched address data from the transaction latch 310. Under management from the controller 330, the request library 320 may append address data received from the transaction latch 310 to a request pattern stored within to form a data request. The request library 320 may output the data request to the MUX 360. Thus, the validation FUB 300 may generate new data requests in response to transactions on the external bus.

The controller 330 may be a programmable state machine, in an embodiment, having registers (not shown) that store information identifying the data transactions to which the validation FUB 300 should respond. As shown in FIG. 4, the controller 330 may include a first register 332 to store transaction type data and a second register 334 to store a data request index. The transaction type data may determine the triggering condition to which the validation FUB 300 should respond. The first register 332 may be a CAM register or some other register having match detection logic. During an initialization mode, transaction type data may be loaded into the first register 332. Thereafter, during stress testing, the controller 330 may receive transaction type data from transactions posted on the external bus 130. If the newly receive transaction type data matches the transaction type data stored during initialization, the controller 330 may determine to output a new data request from the validation FUB 300.

The data request index may determine how the validation FUB 300 will respond to a triggering condition. It may be stored in a second register 334, loaded into the register during initialization. The data request index can address a data request pattern stored in the instruction library 320. When the controller 330 determines that a transaction type match occurs with respect to the first register 332, it may apply the index value from the second register 334 to the instruction library 320 and cause data for a harassing transaction to be read out. As noted, the instruction library 320 may append an address value received from the transaction latch 310 with the data request pattern from the library to create a valid data request.

As discussed above, the instruction library 320 may receive address data directly from the transaction latch 310. This embodiment permits the validation FUB 300 to generate external bus transactions (via the data request handler 120) that are directed to the same data referenced in the triggering bus transaction. In an alternate embodiment, the instruction library 320 may generate data requests to addresses that are related, but not identical, to the addresses received from the transaction latch 310.

FIG. 4 illustrates in phantom an optional address manipulator 340 operating under management of the controller 330. The address manipulator 340 may perform arithmetic operations on address data from the transaction latch 310. It may output altered address data to the instruction library 320. For example, the address manipulator 340 may increment or decrement an address by a cache line increment. Alternatively, the address manipulator may increment or decrement the address by a chunk value.

To integrate the validation FUB 300 into existing designs, it may be advantageous to do so in ways that do not require changes to the data request handlers provided in the existing designs. In such applications, it may not be feasible to provision the request library with every data request defined for the agent. For example, in some designs, memory write requests, IO write requests, interrupt requests, interrupt acknowledgment requests and purge requests may require significant changes to request and response logic to support such data requests if they were generated by the validation FUB 300 rather than some other component within an agent. In such embodiments, these requests may be omitted from the transaction library to simplify use of the validation FUB 300 in those designs.

In another embodiment, instructions may be omitted from the transaction library if their use could violate cache coherency or other system integrity mechanisms. As is known, many multiprocessor computer systems operate according to a cache coherency scheme in which each item of data stored in a processor is assigned a coherency state. The state of the data determines how the processor may use the data. For example, in the known "MESI" protocol, data may be assigned to one of four states:

Invalid—Although the agent may have cached a copy of data, the copy is unavailable to the agent. When the agent requires the data, the agent must fetch the data from external memory or from another cache.

Shared—A cached copy is valid and possesses the same value as is stored in external memory. The agent may only read the data. Copies of the data may be stored in the caches of other agents. An agent may not modify data in shared state without first performing an external bus transaction to ensure that the agent has exclusive control over the copy of data.

Exclusive—The cached copy is valid and may possess the same value as is stored in external memory. When an agent caches data in exclusive state, it may read and write (modify) the data without an external cache coherency check.

Modified—The cached copy is valid and is dirty. It may be more current than the copy stored in external memory. The data must be invalid in all other agents.

According to an embodiment of the present invention, a transaction library may omit certain transactions that could cause a system to violate cache coherency rules. For example, a zero data length transactions such as BRL0 (bus read line with zero length), IO reads and other transactions that require coherency support may be omitted in an embodiment.

Figure 5:
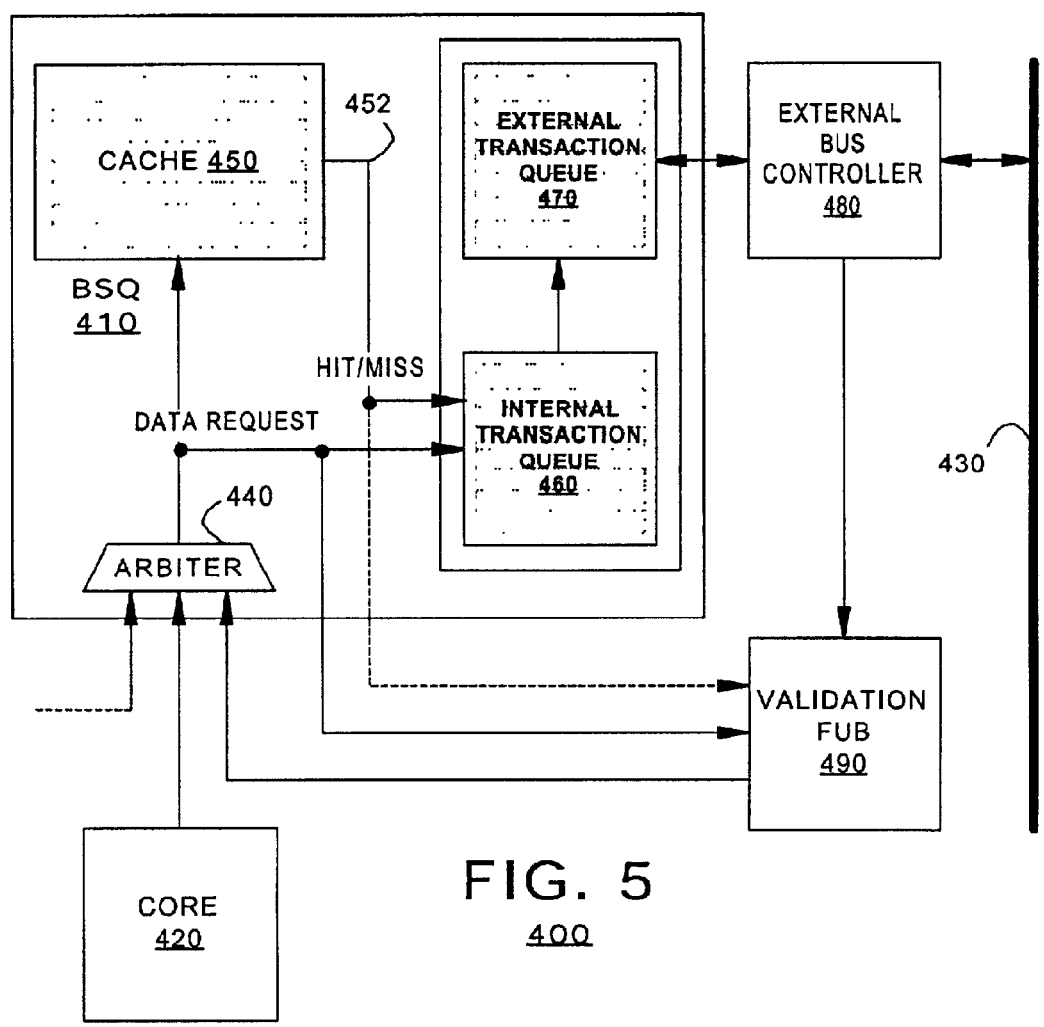
FIG. 5 illustrates an embodiment of a processor constructed in accordance with an embodiment of the present invention.

FIG. 5 illustrates an embodiment of a processor 400 constructed in accordance with an embodiment of the present invention. The processor 400 may include a bus sequencing unit 410 ("BSU") and a core 420. Both the BSU 410 and the core 420 may operate at much greater speeds than are associated with an external bus 430. The external bus 430 interconnects the processor 400 with other components such as other processors, memories and other devices (not shown).

BSUs per se are known. They may include an arbiter 440, a cache memory 450, an internal queue 460 and an external transaction queue 470. The arbiter 440 may receive requests from a variety of inputs, such as from the core 420 and perhaps from other sources. Requests may include a request code representing the type of request being made and, where appropriate, an address identifying a memory location to which the request is directed.

The cache 450 may be an internal memory. As is known, relative to core cache memories (not shown), the cache 450 typically possesses much greater capacity. For example, a typical cache 450 may be a 256K memory. By contrast a core data cache may be a 16K memory and a core instruction cache may be an 16K memory. The cache 450 may be a unified cache, one that stores both instruction data and variable data (collectively, "data"). The BSQ 400 also may interface with higher levels of cache (not show), which may 3H or more in size.

Read requests from the arbiter 440 may be input to both the cache 450 and to the internal queue 460. The cache 450 may include control logic (not shown) that can determine whether the requested data is stored in the cache 450. If so, the request is said to "hit" the cache 450. The cache 450 will furnish the requested data to the core 420 over a communication path (also not shown). Otherwise, the request is said to "miss" the cache. The cache 450 may communicate a hit or a miss to the internal queue 460 over a line 452.

The internal queue 460 may include control circuitry and buffer memory to process requests from the arbiter 440. The internal queue 460 also receives hit/miss indicators from the cache 450. If a read request hits the cache 450, the internal queue 460 may permit the queued request to terminate as it advances out of the queue 460. But if a read request misses the cache 450, the request should be completed by retrieving the requested data from an external memory (not shown). In this case, when the read request advances out of the internal queue 460, the internal queue 460 may cause the request to be entered in the external transaction queue 470.

The external transaction queue 470 also may include control circuitry and buffer memory. It may cause external bus transactions to be posted on the external bus 430 pursuant to queued requests issued from within the agent. The external transaction queue 470 may control operation of the bus 430 via an external bus controller 480. Typically, a bus protocol will have been defined for the bus 430, the external transaction queue 470 and external bus controller 480 may generate and receive signals in accordance with such a protocol.

In an alternate embodiment, the internal queue 460 and external transaction queue 470 may be replaced by a unitary queue. Accordingly, FIG. 5 illustrates the internal queue 460 and external transaction queue 470 as included in a single "transaction queue." The principles of the present invention find application with either embodiment. In this regard, the operation and structure of a BSQ 410 is well known.

According to an embodiment, a validation FUB 490 may observe data requests posted within the BSQ 410 and generate harassing transactions in response thereto. In one embodiment, the validation FUB 490 may capture data requests output by the arbiter 440. The validation FUB 490 may compare data identifying the request type and source to determine whether to generate a new data request. If so, the new data request may be output to the arbiter 440 for independent processing.

In this embodiment, the BSQ 410 may process both the captured data request and the new data request as independent transactions. The processing of two independent transactions directed to the same address may lead to certain performance boundary conditions within the BSQ 410 itself. And, of course, evaluating the processor's performance in the event of the boundary conditions is one of the goals of stress testing.

In another embodiment, shown in phantom, the validation FUB 490 also may monitor the hit/miss outputs of the internal cache 450. In such an embodiment, triggering conditions may be defined for the validation FUB 490 based not only upon the request type of a data request but also based on whether requested data is present in the internal cache 450.

As described above, a validation FUB 150 (FIG. 1) may generate a harassing bus transaction in response to a triggering bus transaction observed on the external bus 130 (FIG. 1). In an alternate embodiment, a validation FUB 150 may generate a harassing bus transaction in the absence of new transactions on the external bus 130. Many bus protocols identify the onset of a new transaction with a predetermined signal. In the bus protocol of the Pentium Pro® processor, assertion of an ADS# signal indicates the onset of a new transaction. A new transaction may be posted on the bus during each bus clock cycle. In an embodiment, a validation FUB 150 may track the number of consecutive cycles that expire without a new transaction being posted on the external bus. If the number exceeds a predetermined threshold (e.g. 2), the validation FUB 150 may spontaneously generate a harassing transaction. The harassing transaction may be directed to an address last captured from an external bus transaction, perhaps having been modified (incremented or decremented).

Figure 6:
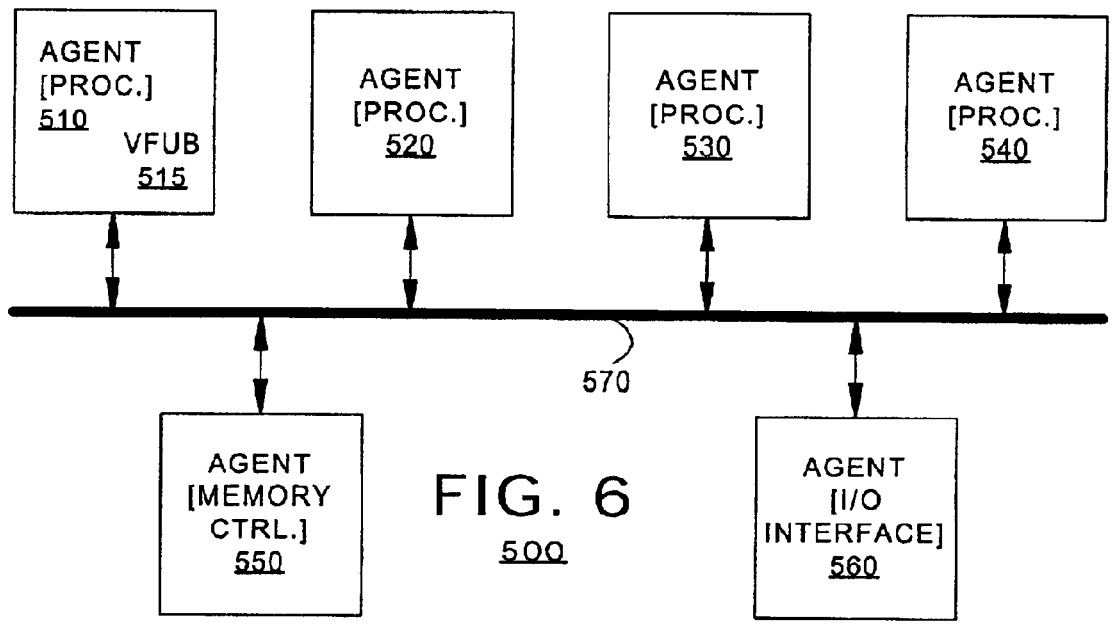
FIG. 6 illustrates an exemplary computer system according to an embodiment of the present invention.

As noted, the validation FUB may be provided within an agent in a computer system. A validation FUB need be provided in only one of the agents in the system to be able to stress test the system. FIG. 6 illustrates an exemplary computer system 500 according to an embodiment of the present invention. The computer system 500 may include multiple agents 510, 520, 530, 540, 550 and 560, each coupled to a common communication bus 570. Of the agents, four are shown as processors 510, 520, 530, and 540. Other agents include a system memory 550 and an IO interface 560. A validation FUB 515 is illustrated as being a member of one of the processors 510 but, alternatively, could be provided in one or more of the other agents 520, 530, 540, 550, and 560.

Figure 7:
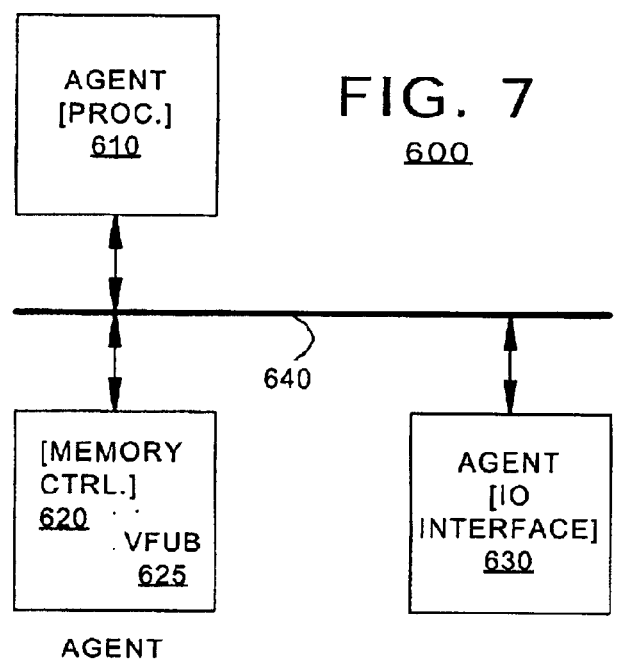
FIG. 7 illustrates an exemplary computer system according to another embodiment of the present invention.

FIG. 7 illustrates another exemplary computer system 600 according to an embodiment of the present invention. Again, multiple agents 610, 620, and 630 are coupled to a common communication bus 640. In this example, only one agent 610 is shown as a processor. A memory controller 620 and IO interface 630 also are shown in FIG. 7. In this example, a validation FUB 625 is shown as a member of the memory controller. Alternatively, the validation FUB could be a member of the IO interface 630 (not shown).

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of stress testing an integrated circuit, comprising:
   capturing a external bus transaction,
   if a request type of the transaction matches a triggering condition, generating a data request, and
   generating a harassing bus transaction based on the data request.

2. The method of claim 1, wherein the external bus transaction and the harassing bus transaction are generated by the same integrated circuit.

3. The method of claim 1, wherein the data request includes an address contained in the external bus transaction.

4. The method of claim 1, wherein the external bus transaction includes a first cache line address in a system memory and the data request includes a second cache line address adjacent to the first cache line address.

5. The method of claim 1, wherein the external bus transaction includes an address directed to a first portion of a cache line in a system memory and the data request includes a second cache line directed to a second portion of the cache line.

6. The method of claim 1, wherein the harassing bus transaction is generated before the external bus transaction concludes.

7. A stress testing method for a computer system, comprising:
   counting a number of external bus cycles that occur without onset of a new transaction on the external bus,
   determining if the number meets a threshold value,
   if so, generating a harassing transaction on the external bus.

8. The method of claim 7, wherein the harassing transaction includes an address from a previous bus transaction having been modified to refer to an adjacent cache line.

9. An integrated circuit, comprising:
   a processor core, the processor core to operate in the domain of a first clock,
   a data request pipeline having an external bus interface that is in communication with an external bus, the external bus to operate in the domain of a second clock, where the second clock is different from the first clock, and
   a validation FUB having an input coupled to the external bus interface of the data request pipeline, the validation FUB to operate in the domain of the first clock, the validation FUB further comprising:
   a transaction latch coupled to the external bus interface, and
   a request library in communication with the transaction latch and having an output coupled to the data request pipeline, to store transaction request types according to an external bus protocol.

10. The integrated circuit of claim 9, wherein the first clock is faster than the second clock.

11. The integrated circuit of claim 9, further comprising an address manipulator coupled to the transaction latch and to the request library.

12. An integrated circuit, comprising:
   a processor core,
   a bus sequencing unit in communication with the processor core and an external bus, the bus sequencing unit comprising;
   an arbiter to receive a first data request,
   a cache memory to store data, and
   a transaction queue in communication with the arbiter and the cache memory to process the first data request, and
   a validation FUB in communication with the bus sequencing unit and the external bus, the validation FUB to receive the first data request from the arbiter to generate a second data request when the first data request matches a triggering condition.

13. The integrated circuit of claim 12, where an output of the validation FUB is coupled to the arbiter.

14. The integrated circuit of claim 13, wherein the arbiter processes the first data request and the second data request as independent transactions.

15. An integrated circuit, comprising:
a processor core,
a bus sequencing unit in communication with the processor core and an external bus, the bus sequencing unit further comprising;
an arbiter to receive a first data request,
a cache memory to output a hit/miss signal in response to the first data request,
a transaction queue in communication with the arbiter and the cache memory to process the first data request, and
a validation FUB in communication with the bus sequencing unit and the external bus, the validation FUB to receive the hit/miss signal from the cache memory to generate a second data request when the hit/miss signal matches a triggering condition.

16. The integrated circuit of claim 15, wherein the triggering condition is whether requested data is present in the cache memory.

17. The system of claim 15, where an output of the validation FUB is coupled to the arbiter.

18. The system of claim 16, wherein the arbiter is to process the first data request and the second data request as independent transactions.

19. A diagnostic method for an integrated circuit, comprising:
detecting an onset of a first transaction on an external bus,
reading an address of the first transaction from the external bus, and
in response to the detected transaction, issuing a read request in a second transaction on the external bus, the read request directed to the address read from said first transaction from the external bus.

20. The method of claim 19, wherein an onset of the second transaction occurs before the first transaction concludes.

21. The method of claim 19, further comprising issuing a plurality of read requests directed to addresses of subsequent transactions detected on the external bus.

22. The method of claim 19, wherein the first and second transactions are issued by the same integrated circuit.

23. A method of testing an integrated circuit, comprising:
storing a request type in a register,
observing a transaction on an external bus, and
if the request type of the external bus transaction matches the request type stored in the register, generating a data request on the external bus.

24. The method of claim 23, wherein the data request on the external bus is a harassing bus transaction.

25. A system comprising:
a data bus;
means for latching transaction data observed on the data bus, the transaction data to include a first data request to a first data address;
means for determining whether a type of the first data request latched by said means for latching satisfies a trigger condition;
means for forming a second data request based on the first data address if said means for determining determines that the trigger condition is satisfied; and
means for posting the second data request to the data bus as a harassing transaction.

26. The system of claim 25, wherein said means for forming the second data request is to form the second data request by appending the first data address onto a request pattern.

27. The system of claim 25, futher comprising;
means for incrementing or decrementing the first data address,
wherein said means for forming the second data request is to form the second data request by appending the increment or decremented first data address onto a request pattern.

* * * * *

UNITED STATES PATENT AND TRADEMARK OFFICE
CERTIFICATE OF CORRECTION

PATENT NO. : 7,032,134 B2
APPLICATION NO. : 09/818788
DATED : April 18, 2006
INVENTOR(S) : Ayman G. Abdo et al.

It is certified that error appears in the above-identified patent and that said Letters Patent is hereby corrected as shown below:

Column 9, line 57:   "a external bus" should be --an external bus--

Column 10, line 17:   "a threshold value," should be --a threshold value, and--

Column 10, line 28:   "that is in communication with" should be --coupled to--

Column 10, line 32:   "a validation FUB" should be --a validation functional unit block (FUB) --

Column 10, line 39:   "in communication with" should be --coupled to--

Column 10, line 56:   "in communication with" should be --coupled to--

UNITED STATES PATENT AND TRADEMARK OFFICE
CERTIFICATE OF CORRECTION

PATENT NO. : 7,032,134 B2
APPLICATION NO. : 09/818788
DATED : April 18, 2006
INVENTOR(S) : Ayman G. Abdo et al.

It is certified that error appears in the above-identified patent and that said Letters Patent is hereby corrected as shown below:

Column 10, line 58: "a valiadation FUB in communication with" should be --a validation functional unit block (FUB) coupled to--

Column 11, line 3: "in communication with" should be --coupled to--

Column 11, line 8: "data request," should be --data request, and--

Column 11, line 13: "a valiadation FUB in communication with" should be --a validation functional unit block (FUB) coupled to--

Signed and Sealed this

Eighth Day of August, 2006

JON W. DUDAS
*Director of the United States Patent and Trademark Office*